Patented July 18, 1944

2,354,164

UNITED STATES PATENT OFFICE 2,354,164

COPPER RUBY GLASS

Woldemar A. Weyl, State College, Pa., assignor to Monsanto Chemical Company, a corporation of Delaware No Drawing. Application February 29, 1940, Serial No. 321,447

7 Claims. (Cl. 106—53)

This invention relates to the production of copper ruby glass.

An object of the present invention is to provide an improved type of copper ruby glass wherein the copper is kept in the reduced state by compounds of phosphorus and intermediately formed compounds, as for example, copper phosphide, which compounds are soluble in glass and, when oxidized, have a tendency to form a second phase of phosphate, immiscible in the glass.

A further object of the present invention is to provide an improved type of copper ruby glass by the simultaneous tendency to produce a second phase in the base glass, thus causing nucleus formation for the copper crystals with the production therein of the colloidal red copper color.

Hitherto copper ruby glasses have been prepared from glass batches to which cuprous or cupric oxide was added in conjunction with reducing agents such as sugars or cream of tartar in combination with metallic tin. Such glass must be melted under carefully controlled furnace atmosphere conditions; that is the furnace atmosphere must be maintained under reducing conditions.

However these reducing agents are not soluble in the molten glass and any excess thereof not used for reduction must be eliminated by addition of oxidizing agents in carefully controlled amounts, or must be volatilized or segregated as such.

It has also been suggested to use cyanogen compounds as reducing agents, whereby the control is said to be facilitated and the use of tanks or open pots made possible.

I have now found that an improved type of copper ruby glass may be produced by the simultaneous tendency to form a second phase in such glasses during the colloid forming reaction attending the reduction and dissolution of the copper or copper compounds in the glass batch. For the present purpose I have found that phosphorus and phosphorus compounds are particularly well suited. The favorable action of these substances appears to be two-fold: Intermediary formation or solution of copper phosphide prevents reoxidation to cupric compounds in the melt or causes reduction of the same upon its formation. Thus the copper is held in its lower valence state and may in accordance with the prevalent theory decompose on striking to cupric copper and elemental copper or may be directly reduced to metallic copper. On the other hand some of the phosphorus may be transformed into phosphorus oxides and give rise to the formation of a finely dispersed second glassy phase based upon or comprising $P_2O_5$ in the base glass and thus offer favorable conditions for nucleus formation and stabilization for the copper crystals to be formed for bringing about the red colloidal copper ruby color.

During the reduction of the copper compounds, copper phosphide is formed which is soluble in the glass and thereupon builds up a stored reducing power which prevents accidental damage from oxidizing agents, such as changes due to the furnace atmosphere characteristics.

The formation of copper ruby glasses is characterized by the formation of metallic copper, from copper ions by reduction. Thus the copper must be present in true solution which under a certain heat treatment develops an increased particle size and the growth of particles of colloidal size, which are responsible for the ruby color. It is therefore apparent that the development of satisfactory glasses of this type involves the development and control of equilibria between the phases: dissolved copper ions: dissolved metallic copper; colloidal copper.

An advantage attending the introduction of phosphorus and phosphorus compounds such as herein disclosed is that it helps to fine the glass, an operation which is usually quite difficult with glasses which have to be melted under reducing conditions.

While ordinary white or yellow phosphorus may be used in the practice of my invention, I prefer for reasons of ease of handling, the use of red phosphorus or phosphides particularly copper phosphide $Cu_3P_2$, or phosphite $CuHPO_3$, or the phosphides of any of the glass forming metals such as sodium, potassium, calcium, aluminum, tin, iron or even the phosphite, hypophosphite or hypophosphate of these metals. Suitable compounds of phosphorus are those compounds in which the phosphorus is contained therein in a lower state of oxidation than that of the pentoxide, $P_2O_5$.

The amount of red phosphorus or other phosphorus compound utilized in my process should preferably be determined by preliminary experiments, because obviously a part of the red phosphorus or phosphide may burn up and escape from the glass batch before it has dissolved or reacted. This is not so likely when using some of the more stable compounds of phosphorus, as for example copper phosphide, altho here too some may be lost.

The following examples illustrate the production of a copper ruby glass in accordance with my invention:

Example 1

A glass batch is prepared containing the following ingredients:

| | Parts by weight |
|---|---|
| $SiO_2$ | 54.5 |
| $K_2O$ | 8.2 |
| $Na_2O$ | 5.3 |
| PbO | 28.1 |
| $SnO_2$ | 1.2 to 2.0 |
| CuO | 0.6 to 0.9 |
| Red phosphorus | 0.5 to 1.0 |

The composition is charged into a glass melting device, (pot or tank) melted and fined preferably by the excess of phosphorus. An excellent grade of copper ruby glass results if the glass is drawn out of the furnace, worked into shape in one of the usual ways, for example in a press mold, and then subjected to a reheating treatment at over 550° C. in order to develop the color. The precise temperature and time necessary for development depends upon the depth of color desired and is determined by observation.

Example 2

| | Parts by weight |
|---|---|
| $SiO_2$ | 54.5 |
| $K_2O$ | 8.5 |
| $Na_2O$ | 5.3 |
| PbO | 28.1 |
| $SnO_2$ | 1.2 to 2.0 |
| Copper phosphide | 1.0 |
| Red phosphorus | 0.5 |

The composition is treated as in Example 1 above; and also produces an excellent ruby glass.

Example 3

| | Parts by weight |
|---|---|
| $SiO_2$ | 54.5 |
| $K_2O$ | 8.5 |
| $Na_2O$ | 5.3 |
| PbO | 28.1 |
| Tin phosphide | 2.0 |
| Copper phosphide | 1.0 |

This glass is treated as in Example 1 above and will also produce an excellent grade of copper ruby glass.

The above compositions are submitted by way of illustration only, as the glasses produced by my invention may be varied considerably in composition. The amount of phosphorus used will depend somewhat upon the melting conditions employed and the particular phosphorus bearing material used in the composition. For the production of transparent ruby glasses, it is desirable not to exceed 2% of phosphorus since with larger amounts there is a tendency to produce phosphates and cause immiscibility and consequently opacity.

Having now particularly described my invention and the manner in which it may be applied, what I claim is:

1. A copper ruby glass comprising an ordinary glass and containing in addition a copper phosphide dispersed therein.

2. A copper ruby glass comprising an ordinary glass containing copper phosphide dissolved therein and also metallic copper colloidally dispersed therein.

3. A copper ruby glass comprising the usual glass forming ingredients and containing copper colloidally dispersed therein and also a second glassy phase based upon phosphorus pentoxide, $P_2O_5$, said glass containing phosphorus in a reduced state of oxidation, not to exceed 2% by weight of said glass.

4. A copper ruby glass comprising the usual glass forming ingredients and containing copper colloidally dispersed therein and containing a phosphide selected from the class consisting of copper phosphide and tin phosphide, the content of phosphorus present as said phosphide not exceeding 2% of said glass.

5. A copper ruby glass batch comprising the ordinary glass forming ingredients and containing CuO, together with red phosphorus not to exceed 2% by weight of said batch.

6. A copper ruby glass batch comprising the ordinary glass forming ingredients and containing copper phosphide and red phosphorus in an amount not to exceed 2% by weight of said batch.

7. A copper ruby glass batch comprising the ordinary glass forming ingredients and containing copper phosphide and tin phosphide, the phosphorus content of which does not exceed 2% by weight of said batch.

WOLDEMAR A. WEYL.